United States Patent [19]

Olofsson

[11] 4,026,196
[45] May 31, 1977

[54] DEVICE FOR DRIVING A PUMP PISTON

[75] Inventor: Hans Kristoffer Olofsson, Huddinge, Sweden

[73] Assignee: Atlas Copco Aktiebolag, Nacka, Sweden

[22] Filed: Nov. 6, 1975

[21] Appl. No.: 629,379

[30] Foreign Application Priority Data

Nov. 22, 1974 Sweden .............................. 7414679

[52] U.S. Cl. .................................. 92/140; 74/22 R; 417/534
[51] Int. Cl.² ...................... F01B 9/00; F04B 7/16; F16H 37/16
[58] Field of Search ................... 417/534, 500, 492; 123/45; 74/22; 92/140

[56] References Cited

UNITED STATES PATENTS

| | | | |
|---|---|---|---|
| 950,945 | 1/1910 | Moss | 417/500 |
| 1,138,960 | 5/1915 | Lafitte | 123/45 |
| 2,437,568 | 3/1948 | Urso | 417/500 |
| 2,538,463 | 1/1951 | Lloyd | 417/492 |
| 2,969,777 | 1/1961 | Blazs | 418/53 |
| 3,102,517 | 9/1963 | Day et al. | 418/51 |
| 3,410,477 | 11/1968 | Hartley | 417/534 |

FOREIGN PATENTS OR APPLICATIONS 215,257  5/1924  United Kingdom .............. 417/500

*Primary Examiner*—William L. Freeh
*Attorney, Agent, or Firm*—Eric Y. Munson

[57] ABSTRACT

A piston pump assembly is disclosed in which the rotation of the drive shaft of the driving motor reciprocates the piston via a single-row spherical ball bearing which is eccentrically arranged in relation to the drive shaft. The piston is turned about its linear path of movement in synchronism with its reciprocation.

4 Claims, 2 Drawing Figures

DEVICE FOR DRIVING A PUMP PISTON

BACKGROUND OF THE INVENTION

The present invention relates to a pump aggregate of the type comprising a driving motor with a rotatable drive shaft and a pump, as e.g. a gas compressor, of the piston type which is driven by the driving motor.

In known designs of this type the pump piston is usually driven by crank shaft connected to the driving motor and a connecting rod. In addition to those bearings required for journalling the crank shaft, such a design requires two bearings namely one between the connecting rod and the crank shaft, and a second one between the connecting rod and the piston pin. Since the last mentioned bearing is situated inside the piston lubrication problems arise in a compressor designed to deliver oil free air.

In the present invention, which is defined in the appended claim 1, a single-row spherical ball bearing is used as the only bearing in the transformation of the rotational movement of the drive shaft of the driving motor into a reciprocating movement of the pump piston. This bearing is furthermore situated outside the piston so that no lubrication inside the piston is needed.

BRIEF DESCRIPTION OF THE DRAWINGS

An embodiment of the invention is described below with reference to the accompanying drawing in which FIG. 1 showns a side view of a piston compressor aggregate incorporating the invention partly in section.

DESCRIPTION OF A SPECIFIC EMBODIMENT

Figure 1:
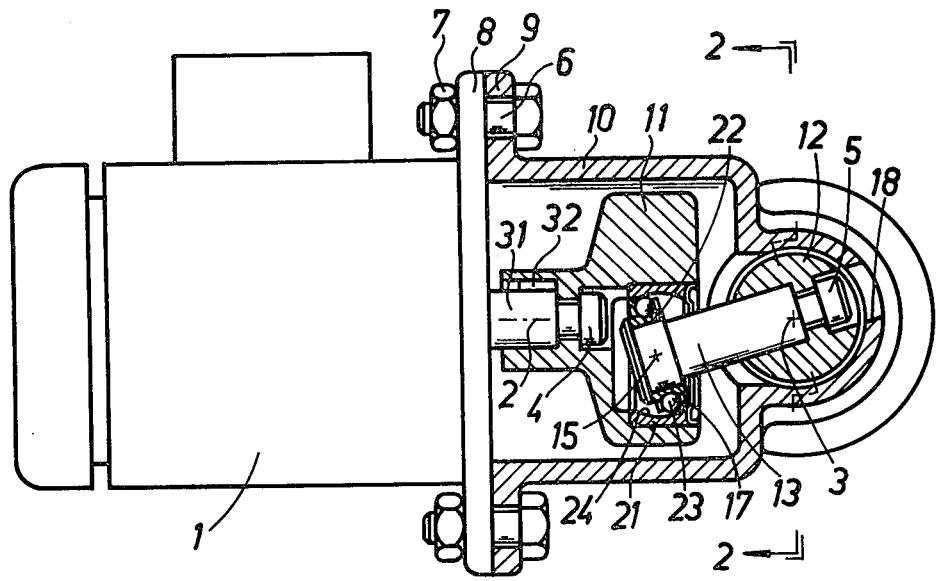
Figure 2:
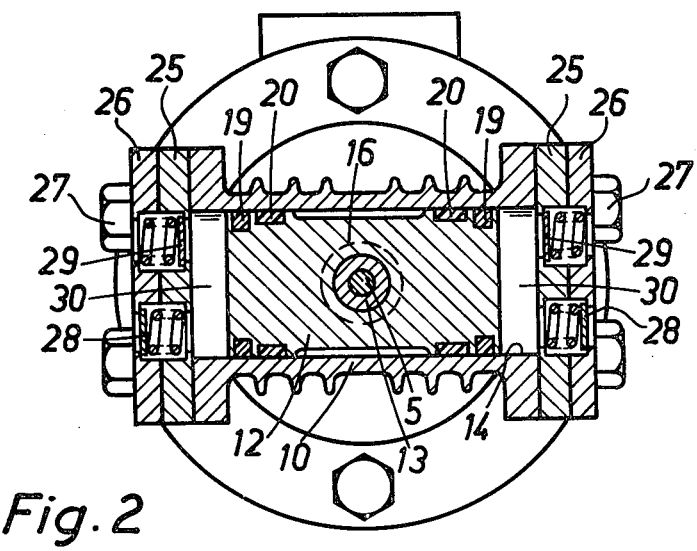
FIG. 2 shows a section according to 2—2 in FIG. 1.

The piston compressor aggregate shown in the drawing comprises a driving motor 1 provided with driving shaft 31 and a flange 8 to which a flange 9 on a compressor housing 10 is connected by means of screws 6 and nuts 7. The compressor housing 10 is provided with a cylinder bore 14 in which a compressor piston 12 is guided for reciprocation along a linear path of movement 3. A second element or piston rod 13 is by means of a screw 5 rigidly connected with the compressor piston 12. A first element or drive wheel 11 is by means of a key 32 and a screw 4 rigidly connected with the drive shaft 31 of the driving motor for rotation about the axis 2. The first element a drive wheel 11 is provided with a recess which is eccentrically arranged in relation to the axis 2 and in which the outer race 21 of a single-row spherical ball bearing is arranged. The inner race 22 of the bearing is force fit on the rod 13 and comprises a groove for the balls 23 which are kept apart by a ball retainer. The balls also contact the inner spherical surface 24 of the outer race.

The compressor shown is intended for delivering oil free air. The first element 11 is therefore provided with a seal 17 in order to prevent lubricant from seeping from the ball bearing into the compressor cylinder. Furthermore, the compressor piston 12 is in the shown embodiment provided with piston rings 19 and supporting rings 20 of plastic material which do not require lubrication. The compressor piston 12 is double acting so that the compressor shows two compression chambers 30 each covered by a cylinder head comprising two parts 25, 26. The cylinder heads are attached to the compressor housing 10 by means of screws 27 and comprise usual inlet valves 28 and outlet valves 29. The compressor housing 10 is furthermore provided with an opening 18 through which the screw 5 can be introduced and tightened when the compressor is assembled.

The compressor aggregate shown works in the following way. The driving motor 1 rotates the first element 11 about the axis 2. The rotation of the first element 11 causes the point 15, which is assumed to be on the axis of symmetry of the shaft 13, to be driven in an orbital path 16. As a result thereof the compressor piston 12 is reciprocated in the cylinder bore 14 in a linear path a synchronously with an oscillating turning motion about the said linear path of movement 3. Since the type is of the single-row spherical ball bearing the radial play makes it possible for the inner race 22 to move axially in relation to the outer race 21 during operation of the compressor.

The above described and in the drawing shown embodiment of the invention is only to be regarded as an example which can be modified within the scope of the subsequent claims.

What I claim is:
1. A pump assembly comprising a driving motor (1) which is provided with a rotatable drive shaft (31), and a piston (12) which is guided in a cylinder bore (14) for reciprocation along a linear path of movement (3) therein, said assembly comprising a single-row spherical ball bearing whose outer race (21) is eccentrically arranged in relation to said drive shaft (31) in a first element (11) which is rigidly connected with said drive shaft and whose inner race (22) is arranged on a second element (13) which is rigidly connected with said piston (12), so that rotation of the drive shaft causes the piston (12) to reciprocate in the cylinder bore (14) in a linear path synchronously with an oscillating turning motion about said linear path of movement (3).

2. A pump assembly according to claim 1, in which said race (21) is provided with an inner spherical surface (24).

3. A pump assembly according to claim 2, in which said piston (12) is a double acting compressor piston.

4. A compressor for a fluid medium comprising:
 a. a compressor housing (10) connected to a drive motor (1) having a drive shaft extending into said compressor housing;
 b. a cylinder bore (14) forming part of said compressor housing;
 c. a double acting piston (12) arranged for reciprocation in a linear path (3) within said cylinder;
 d. a piston rod (13) having one end thereof rigidly connected to said piston (12);
 e. a drive wheel (11) mounted coaxially on said drive shaft for rotation about an axis (2);
 f. a recess in said drive wheel arranged eccentrically in relation to said axis (2);
 g. the other end of said piston rod (13) being accommodated in said recess for revolvement by said drive wheel in an orbital path;
 h. ball bearing means permitting articulatory motion between said other end of the piston rod and said recess to cause said piston to rotate about the exis thereof while a point (15) located on the axis of symmetry of the piston rod (13) is revolved in the orbital path to thereby reciprocate said piston in a linear path synchronously with the orbital path thereof;
 i. said ball bearing being of the single-row spherical ball type comprising: an outer race (21) fitted in said recess, and an inner race (22) fitted on said shaft (12) accommodating a row of spherical balls (23) bearing against said spherical surface (24).

* * * * *